United States Patent Office 3,099,618
Patented July 30, 1963

3,099,618
HYDROCRACKING PROCESS FOR THE CONVERSION OF HYDROCARBONS UTILIZING A PLATINUM-COBALT-MOLYBDENUM CATALYST COMPOSITE
Lloyd E. Gardner and Robert J. Hogan, Bartlesville, Okla., assignors to Phillips Petroleum Company, a corporation of Delaware
No Drawing. Filed Feb. 1, 1960, Ser. No. 5,599
8 Claims. (Cl. 208—112)

This invention relates to a hydrocracking process. In one of its aspects, the invention relates to the hydrocracking of a heavy oil, for example, an oil, such as Wafra oil, containing sulfur, employing a catalyst as herein described.

It has been known to employ cobalt-molybdate catalysts in the hydrocracking of high sulfur crudes. Thus, cobalt molybdate on alumina has been employed at a temperature of about 650–800° F. and at a pressure of about 100–1000 p.s.i.g. to treat petroleum fractions containing in excess of about 1.5 weight percent sulfur in the presence of hydrogen by passing the fraction at a rate of about 0.25 to 3 volumes of feed per hour per volume of catalyst with hydrogen at rates of 500–5000 standard cubic feet per barrel of feed.

In the use of cobalt-molybdate catalysts, the operation has not been considered entirely satisfactory in the removal of the undesirable sulfur and the carbon residue.

Heretofore, a platinum catalyst has not been suitable for the hydrogenation of high sulfur crudes because the platinum was easily poisoned by the sulfur.

Experimenting with a platinum promoted cobalt-molybdate catalyst, we have discovered that high sulfur containing oils can be converted at relatively lower temperatures obtaining reduced coke formation and greater reduction in the sulfur content of the product, as well as a greater reduction in the carbon residue content of the product, all of which factors contribute to a greatly improved process.

The main advantage in the above processing of a high sulfur, highly asphaltic crude is that a very high quality synthetic crude is produced which is an excellent feed stock for a catalytic cracking unit due to the low sulfur and carbon residue contents. Also partial saturation occurs in the condensed aromatics present in the oil which makes the crude more amenable for catalytic cracking.

It is an object of this invention to provide a hydrocracking process. It is another object of this invention to hydrocrack a high sulfur content oil. It is a further object of this invention to provide a hydrocracking process employing a catalyst containing platinum which is stable in the presence of high sulfur content oils. It is a still further object of the invention to provide a hydrocracking process employing a platinum containing catalyst which will yield reduced coke formation, a greater reduction in sulfur content and in the carbon residue content of the product and do so at a relatively lower conversion temperature.

Other aspects, objects and the several advantages of the invention are apparent from this description and the appended claims.

According to the invention, there is provided a process for the hydrocracking of a hydrocarbon oil employing a catalyst, as herein set forth. More particularly, according to the invention, the operating conditions can range as follows: temperature—700–850° F.; pressure—500–3000 p.s.i.g., preferably about 1000–2000 p.s.i.g.; liquid hourly space velocity—0.1–10; and hydrogen—500–10,000 cubic feet per barrel of oil being used as charge stock.

The catalyst employed in the process of the invention is a platinum promoted cobalt molybdate supported on alumina, and it has the following general composition:

| | Percent |
|---|---|
| Platinum | 1–3 |
| Cobalt (as metal) | 1–10 |
| Molybdenum (as metal) | 1–20 |
| Alumina | Balance |

The catalyst of the invention can be prepared by conventional methods. For example, alumina is impregnated with ammonium molybdate, calcined and shaped, if desired. This base is then impregnated with aqueous solutions of cobalt nitrate and chloroplatinic acid. The impregnated material is then heated in the range of 200–1000° F. so as to produce metallic platinum and cobalt molybdate on the support. In a preferred form, the catalyst will contain approximately 1.2 percent platinum.

The following example describes the preparation of a catalyst used according to this invention.

*Example I*

A commercial alumina was impregnated with a solution containing 27.2 g. $(NH_4)_6Mo_7O_{24} \cdot 4H_2O$ in 200 cc. solution of ethanolamine and water (50/50 vol. percent). The alumina was soaked for 2 hours, drained, dried at 210–230° F., heated at 340–350° F. to remove most of the ethanolamine, and finally calcined in air at 1000° F. for about 6 hours. The resulting catalyst was soaked 2 hours in 150 cc. of solution which contained 44.7 g. $Co(NO_3)_2 \cdot 6H_2O$ and 7.0 g. chloroplatinic acid. The catalyst was drained, dried at 210–230° F. and calcined in air at 1000° F. for about 6 hours. The resulting catalyst was again impregnated with 200 cc. of solution containing 3.5 g. chloroplatinic acid. The catalyst was drained, dried at 210–230° F., and calcined in air at 1000° F. for about 6 hours. By analysis, the catalyst contained 5.3 weight percent Mo, 2.6 weight percent Co, and 1.2–1.5 (estimated) weight percent Pt, and the surface area was 168 m.²/g.

A catalyst, as just described, is particularly useful in hydrocracking crude oils or crude residuums with the following characteristics:

| | Range | Preferred |
|---|---|---|
| Boiling point | (¹) | |
| Sulfur, percent | 1 to 6 | 3 to 4 |
| Carbon residue, percent | 5 to 25 | 8 to 15 |

¹ 400° F. and above.

*Example II*

A commercial cobalt molybdate on an alumina support catalyst was found to have the following analysis: 1.2 Co, 6.0 Mo, balance alumina, with a surface area of 177 m.²/g. This catalyst was soaked for 2 hours in 150 cc. of solution containing 7.0 g. of chloroplatinic acid, drained, dried at 210–230° F., heated at 340–350° F. to remove most of the water, and finally calcined in air at 1000° F. The final catalyst contained 1.2 percent Pt.

The following Example III shows a use of a catalyst according to this invention used to hydrocrack a Wafra 400° F. plus crude oil.

*Example III*

Wafra crude was hydrocracked over a cobalt-molybdate catalyst prepared as follows:

The cobalt-molybdate catalyst was prepared by a two-step impregnation of the metals on commercial alumina. The alumina was soaked for 2 hours in a 200 cc. ethanolamine-water (50/50 vol. percent) solution containing 27.2 g. $(NH_4)_6Mo_7O_{24} \cdot 4H_2O$. The catalyst was drained, dried at 210–230° F., heated at 340–350° F., and calcined overnight at 1000° F. in air. The resulting catalyst was soaked for 2 hours in a 200 cc. solution containing 44.7 g. $Co(NO_3)_2 \cdot 6H_2O$. The catalyst was drained, dried at 210–230° F., and calcined at 1000° F. in air for 6 hours. The catalyst contained 2.5 weight percent Co, and 6.1 weight percent Mo, and had a surface area of 173 m.²/g.

Another portion of the same crude was hydrocracked over a cobalt-molybdate catalyst modified with platinum prepared as described in Example II.

These hydrocracking operations were effected at a temperature of 775° F., a pressure of 1000 p.s.i.g., with 4000 C.f.$H_2$/bbl., and a liquid hourly space velocity of 0.5. The data are shown below for a 24-hour run.

The platinum modified catalyst contained 1.2 percent platinum.

The largest differences were found in inspecting the unconverted 850° F.+ residue fractions.

|  | 0–6 hrs. | | 6–12 hrs. | | 18–24 hrs. | | Charge |
|---|---|---|---|---|---|---|---|
|  | Co—Mo | Co—Mo—Pt | Co—Mo | Co—Mo—Pt | Co—Mo | Co—Mo—Pt |  |
| Percent desulfurization | 98 | 99 | 98 | 98 | 93 | 97 |  |
| Percent carbon res.[1] removed | 90 | 98 | 85 | 90 | 77 | 87 |  |
| Percent conv. of 850° F.+ | 62 | 62 | 60 | 54 | 54 | 43 |  |
| Weight percent S in 850° F.+ | 0.14 | 0.06 | 0.18 | 0.12 | 0.47 | 0.19 | 5.0 |
| Weight percent C.R.[1] in 850° F.+ | 4.1 | 0.7 | 5.3 | 3.9 | 8.7 | 3.2 | 14.6 |
| °API 60° F. product | 32.0 | 32.5 | 30.4 | 30.4 | 28.9 | 29.5 | 18.6 |

[1] Ramsbottom carbon residue.

Example IV

Pt—$CoMoO_4$—$Al_2O_3$ catalysts prepared as in Example III and containing 0, 0.4, 1.2, and 2.8 percent Pt were prepared and tested for hydrocracking activty under the same conditions mentioned in Example III except that run length was 6 hours. In this example, as elsewhere in the specification, the catalyst composition is given in terms of weight of metals present except in the case of alumina. Since the metals can be present in mixed oxidation states, it is preferred to set forth the metal content. It will be understood that the alumina in the catalyst, i.e., the balance of the catalyst in these examples and in this disclosure, is arrived at by making allowance for the fact that cobalt and molybdenum are present as the oxide, as one skilled in preparing catalysts will understand. The catalyst compositions and surface areas were as follows:

| Weight percent metals | | | Surface area m.²/g. |
|---|---|---|---|
| Pt | Co | Mo |  |
| 0.0 | 2.5 | 6.1 | 173 |
| 0.6 | 2.8 | 4.1 | 163 |
| 1.2 | 1.0 | 6.0 | 177 |
| 2.8 | 1.0 | 6.0 | 166 |

Carbon residue and sulfur contents in the 850° F. fractions were as follows:

| Weight percent Pt on catalyst | Weight percent carbon res. in 0–6 hrs. 850° F.+fraction | Weight percent sulfur in 6–12 hrs. 850° F.+fraction |
|---|---|---|
| 0 | 4.1 | 0.28 |
| 0.6 | 4.2 | 0.26 |
| 1.2 | 0.7 | 0.08 |
| 2.8 | 0.8 | 0.11 |

From the data in Example III, it is evident that the percent desulfurization, according to the process of the present invention, obtained at different periods of time up to 24 hours, is equal to or better than that obtained with the cobalt-molybdate catalyst. Percent carbon residue is considerably improved, as is the weight percent of sulfur. Similarly, the data of Example IV show quite considerable improvement when using the process of the present invention for the weight percent sulfur and weight percent carbon residues.

In Example IV, the lowest weight percent carbon residue and weight percent sulfur values have been obtained with a weight percent platinum on a catalyst of 1.2, as can be seen by reading the tabular data.

Example V

Pt—$CoMoO_4$—$Al_2O_3$ and $CoMoO_4$—$Al_2O_3$ catalysts were employed in comparable hydrocracking runs. These runs were 24–27 hours in length at 2000 p.s.i.g., 1.0 LHSV, 800° F. and 4000 c.f./bbl. hydrogen flow. The charge stock was Wafra 400° F.+ topped crude. A downflow fixed bed operation was conducted. The tabulation below summarizes activity data at a steady state period of about 25 hours on stream for the above catalysts:

|  | Charge | $CoMoO_4$ | Pt—$CoMoO_4$ |
|---|---|---|---|
| Conversion of 850 ft., weight percent |  | 51 | 52 |
| Percent desulfurization |  | 92 | 99 |
| Percent carbon residue removed |  | 82 | 92 |
| Liquid product: |  |  |  |
| Weight percent sulfur | 3.6 | 0.30 | 0.048 |
| Weight percent carbon residue [1] | 8.1 | 1.5 | 0.7 |
| °API 60/60 | 18.6 | 29.9 | 31.3 |
| 850° F.+residue: |  |  |  |
| Weight percent sulfur | 5.0 | 0.62 | 0.07 |
| Weight percent carbon residue [1] | 14.1 | 5.2 | 2.4 |

[1] Ramsbottom carbon.

Reasonable variation and modification are possible within the scope of the foregoing disclosure and the appended claims to the invention the essence of which is that a cobalt-molybdate catalyst has been modified by incorporation of platinum and used for the hydrocracking of oils, particularly oils containing relatively high sulfur, and improved results, as set forth herein, have been obtained.

We claim:

1. A method for the hydrocracking conversion of a hydrocarbon oil containing about 1 to about 6 weight percent sulfur which comprises contacting said oil under hydrocracking conversion conditions including an elevated temperature and pressure with a catalyst composition containing 1–3 weight percent platinum, 1–10 weight percent cobalt, as metal, 1–20 weight percent molybdenum, as metal, said constituents being deposited upon a suitable carrier.

2. A process for the hydrocracking of a high sulfur content hydrocarbon oil which comprises contacting said oil containing about 1 to about 6 weight percent sulfur under hydrocracking conversion conditions including an elevated temperature and pressure with a catalyst composition containing 1–3 weight percent platinum, 1–10 percent cobalt, as metal, 1–20 weight percent molybdenum, as metal, and the balance alumina.

3. A process for the hydrocracking of Wafra 400° F.+ crude containing about 1 to about 6 weight percent sulfur which comprises hydrocracking said crude at a temperature in the range 750–850° F., a pressure in the range 500–3000 p.s.i.g., and a liquid hourly space velocity of 0.1–1, using 500–10,000 cubic feet per barrel of oil with a catalyst containing 1–3 weight percent platinum, 1–10 weight percent cobalt, as metal, 1–20 weight percent molybdenum, as metal, and the balance an alumina catalyst support.

4. A process according to claim 3 wherein the weight percent platinum in the catalyst is approximately 1.2.

5. A process according to claim 3 wherein the pressure is of the order of about 2000 p.s.i.g.

6. A method for the conversion of a hydrocarbon crude oil residuum containing about 1 to about 6 weight percent sulfur which comprises contacting said residuum under conversion conditions including an elevated temperature and pressure with a catalyst composition containing 1–3 weight percent platinum, 1–10 weight percent cobalt, as metal, 1–20 weight percent molybdenum, as metal, said constituents being deposited upon a suitable carrier.

7. A method for the conversion of a high sulfur content hydrocarbon crude oil containing about 1 to about 6 weight percent sulfur which comprises contacting said crude oil under conversion conditions including an elevated temperature and pressure with a catalyst composition containing 1–3 weight percent platinum, 1–10 weight percent cobalt, as metal, 1–20 weight percent molybdenum, as metal, said constituents being deposited upon a suitable carrier.

8. A method for the conversion of a high sulfur content hydrocarbon crude oil residuum containing about 1 to about 6 weight percent sulfur which comprises contacting said residuum under conversion conditions including an elevated temperature and pressure with a catalyst composition containing 1–3 weight percent platinum, 1–10 weight percent cobalt, as metal, 1–20 weight percent molybdenum, as metal, said constituents being deposited upon a suitable carrier.

References Cited in the file of this patent

UNITED STATES PATENTS

| | | |
|---|---|---|
| 2,802,794 | Sprauer | Aug. 13, 1957 |
| 2,805,206 | John et al. | Sept. 3, 1957 |
| 2,894,898 | Oettinger et al. | July 14, 1959 |
| 2,897,135 | Doumani | July 28, 1959 |
| 2,946,739 | Gardner et al. | July 26, 1960 |

OTHER REFERENCES

"Catalytic Reforming of Pure Hydrocarbons and Petroleum Naphthas," Ciapetta et al., page 597, in vol. VI, Catalysis, 1958, Reinhold Pub. Co., New York.